(12) United States Patent
Khurgin

(10) Patent No.: US 9,469,945 B2
(45) Date of Patent: Oct. 18, 2016

(54) BALL COLLECTION AND COURT DRYING SYSTEM FOR A TENNIS COURT OR THE LIKE

(71) Applicant: Boris Khurgin, New York, NY (US)

(72) Inventor: Boris Khurgin, New York, NY (US)

( * ) Notice: Subject to any disclaimer, the term of this patent is extended or adjusted under 35 U.S.C. 154(b) by 0 days.

(21) Appl. No.: 14/726,949

(22) Filed: Jun. 1, 2015

(65) Prior Publication Data

US 2016/0258117 A1   Sep. 8, 2016

Related U.S. Application Data

(63) Continuation-in-part of application No. 14/640,083, filed on Mar. 6, 2015.

(51) Int. Cl.
*E01C 11/26* (2006.01)
*A63B 47/02* (2006.01)

(52) U.S. Cl.
CPC ............. *E01C 11/26* (2013.01); *A63B 47/025* (2013.01)

(58) Field of Classification Search
CPC ..................................................... A63B 47/025
See application file for complete search history.

(56) References Cited

U.S. PATENT DOCUMENTS

| | | | |
|---|---|---|---|
| 3,203,696 A | 8/1965 | Sawyer | |
| 3,819,049 A | 6/1974 | Koerner et al. | |
| 3,989,246 A * | 11/1976 | Brown | A63B 47/025 124/53.5 |
| 4,116,192 A | 9/1978 | Scott | |
| 4,116,436 A | 9/1978 | Bjorhn | |
| 4,422,632 A | 12/1983 | Trottet | |
| 4,575,081 A | 3/1986 | Cavanagh | |
| 5,011,144 A * | 4/1991 | Marello | A63B 69/0075 446/179 |
| 5,125,654 A | 6/1992 | Bruno | |
| 5,141,226 A * | 8/1992 | Cavanagh | A63B 47/025 473/460 |
| 5,556,106 A * | 9/1996 | Jurcisin | A63B 47/002 273/395 |
| 6,050,625 A | 4/2000 | Nisbet | |
| 6,629,648 B1 * | 10/2003 | Jones | B05B 15/10 239/200 |
| 6,834,776 B1 | 12/2004 | Corvese | |
| 7,114,877 B2 | 10/2006 | Wilkerson | |
| 8,257,204 B1 * | 9/2012 | Liu | A63B 47/025 473/431 |
| 2006/0068948 A1 | 3/2006 | Mendoza | |
| 2009/0249640 A1 | 10/2009 | Sufleta | |

* cited by examiner

*Primary Examiner* — Gene Kim
*Assistant Examiner* — Jeffrey Vanderveen
(74) *Attorney, Agent, or Firm* — David L. Banner

(57) ABSTRACT

A pneumatic ball gathering system that clears tennis balls from a tennis court using air supplied to at least one discharge nozzle with optional intervening valves forming a structure that is typically disposed underground and selectively raised to clear balls. In one implementation, the structure is located along one side edge of the tennis court. In an alternate implementation, the structure may be located under the net and be configured with at least one nozzle disposed to direct air in both directions away from the net. A collection trough formed with a slope to cause collated balls to roll downward therein is disposed opposite the at least one nozzle. An optional mechanical conveyor system is placed in the trough to move collected balls to a predetermined location. A vertical conveyor raises balls for discharge into an appropriate container. The system may be used to facilitate drying the court after rain.

18 Claims, 13 Drawing Sheets

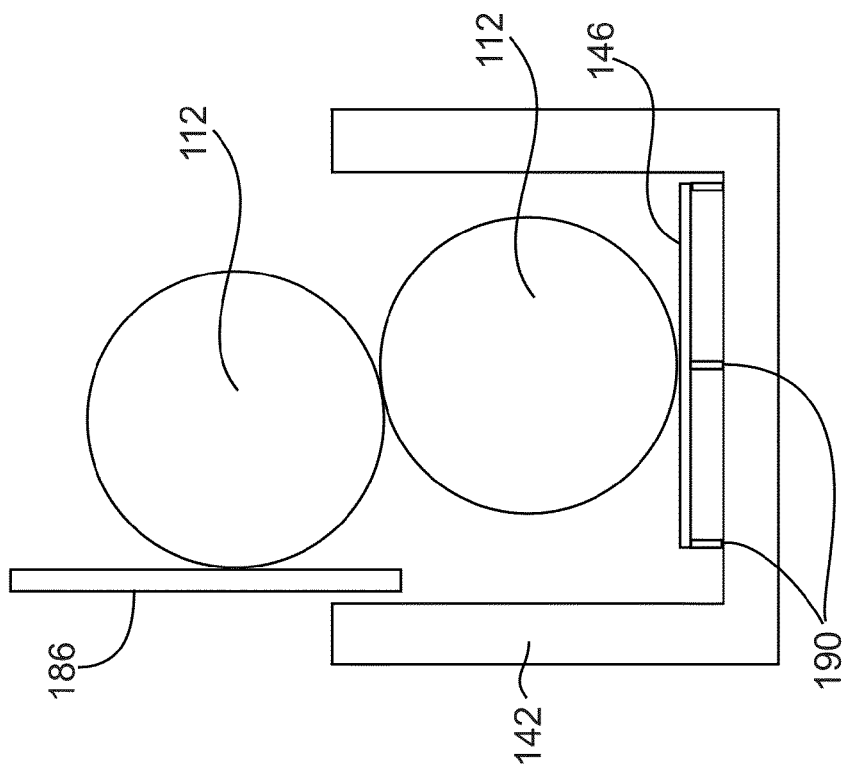
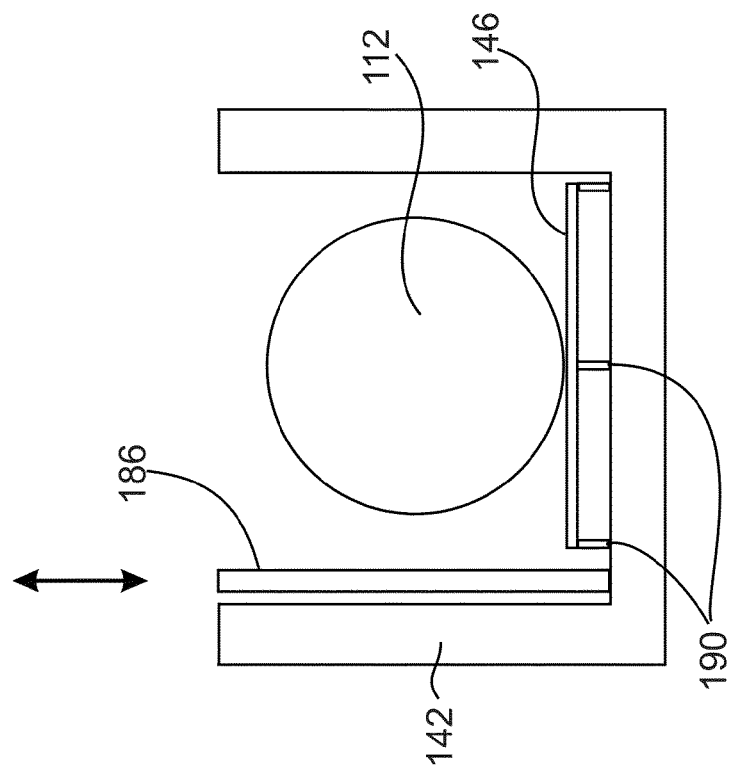

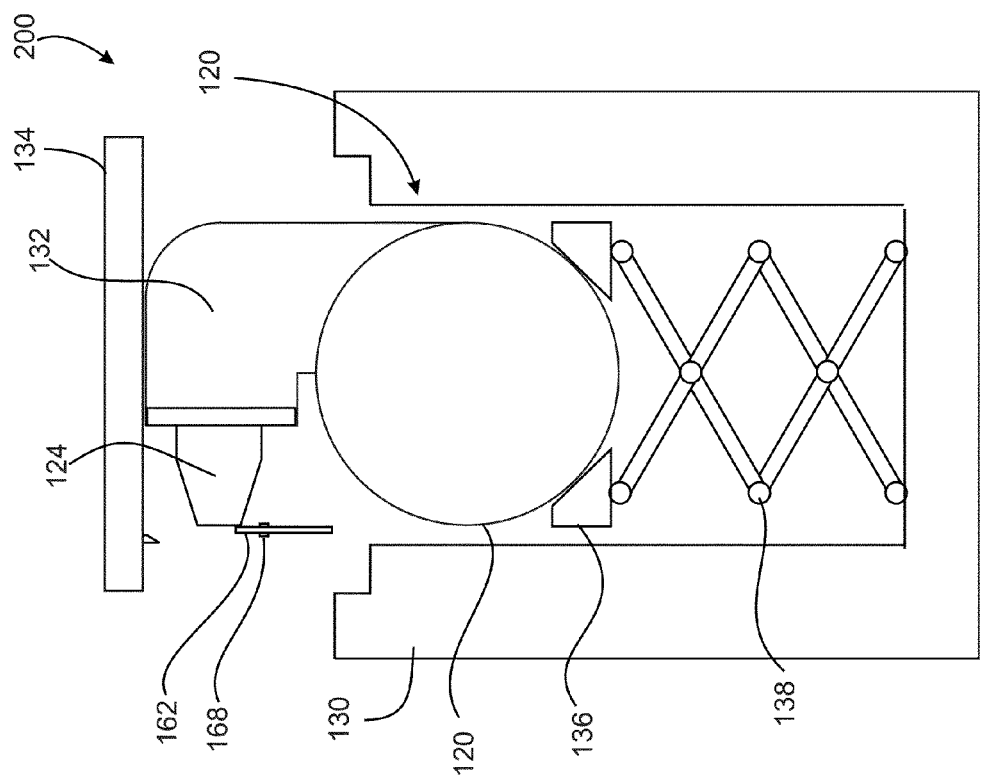
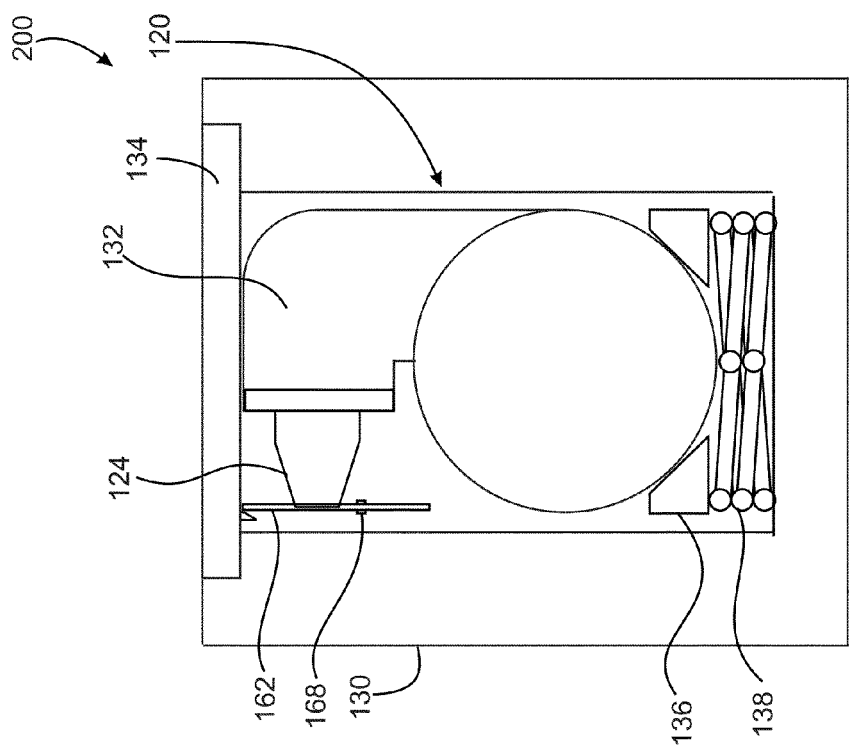

BALL COLLECTION AND COURT DRYING SYSTEM FOR A TENNIS COURT OR THE LIKE

RELATED APPLICATIONS

This application is a Continuation-in-Part of application Ser. No. 14/640,803 filed Mar. 6, 2015 that is included herein in its entirety by reference.

FIELD OF THE INVENTION

The invention pertains to gathering and collection systems and, more particularly, to collection system for tennis balls that includes a court drying feature.

BACKGROUND OF THE INVENTION

Typically, a large portion of the time spent by players in a tennis game is expended retrieving tennis balls from various locations, both on and off the tennis court, where such balls roll dead after one of the players either misses striking the ball with his racket, or strikes it and fails to drive it to the proper area on the tennis court. Such necessity for constantly retrieving the tennis ball after it is knocked out-of-play is laborious and objectionable to many tennis players. This problem is exacerbated during and at the end of tennis practice sessions and clinics, where balls may be hit with no intention of having the ball returned by an opposing player.

One excellent and relatively convenient way for a player to get needed practice is to utilize a ball throwing machine. The use of such machines eliminates the need for a second player or even a regulation size tennis court. Ball throwing machines may be installed in special lanes or practice alleys in which a player practices returning balls propelled by the ball machine. Ball throwing machines typically propel balls in rapid succession. Consequently, a large number of balls are needed to feed the machine in order to keep the machine in operation. Even if the ball thrower is constructed with a large capacity ball hopper, a large number of balls is required to avoid frequent interruptions of practice to pick up the spent balls and reload the ball hopper. Typically, many loose balls remain lying on the court, both distracting the player and providing possible sources of injury if the player steps on or trips over a loose ball.

To avoid these disadvantages and meet the ball requirements for these automatic machines, ball retrieval machines have been developed to retrieve balls previously thrown and to transport them to the intake of the ball throwing machine. One such type of machine uses an air pressure source to propel balls through a tube from a collection point, such as at the bottom of a slope or incline constructed in the playing surface, to the intake of the ball throwing machine.

Many solutions to the problem of retrieving scattered tennis balls have been suggested and implemented. One early solution was to hire a "ball boy" to actively retrieve tennis balls during a practice session or game. This solution added another person moving around the court and surrounding areas and proved distracting to many players. In addition, there was the expense of paying the "ball boy".

Various mechanical devices have been proposed for collecting tennis balls after a game, practice session, or clinic. One such device is the subject of U.S. Pat. No. 3,819,049 for BALL RETRIEVING APPARATUS, issued Jun. 25, 1974 to Francis Koerner et al. Koerner describes a vacuum cleaner-like device for sucking up and storing tennis balls from around the court. This again requires a person to move the device around the area having tennis balls to be retrieved and balls are collected on a one-at-at-time basis.

Yet another method of collecting tennis balls from half of the tennis court consists of two ribs, one rib of which normally is located along each of two opposite edges of the court half. A drive system draws the ribs toward each other while conveying balls on the court surface, thereby to collect the balls from a limited area, and then to return the ribs to their original position. Controls for means are arranged to control the drive means. The controls are preferably actuatable by the player and from a position located within the limited ball-collecting area. Preferably at least one of the ribs is arranged to be angled or curved in the horizontal plane, such that the concave side of the rib faces the other rib. Even with such an apparatus, balls must be manually retrieved and transported.

Yet another ball retrieval system found in the prior art is a system wherein the entire tennis court may be selectively tilted to force tennis balls to roll down the tiled tennis court to a collection area. An added advantage to this system is that the court may be disposed in a tilted position during a rain storm so water does not collect on the surface. Once rain stops, the tennis court is leveled and playing can be started quickly.

Still another retrieval system has a ball retrieval arm mechanism extending from the base line to the tennis net on a tennis court. The arm may be moved along the net. During the retrieving process, the retrieving arm moves only one time during each passage in a transverse direction over one half of the tennis court. The retrieving arm continues its movement until it reaches one side edge of the tennis court. Ball receiving channels are provided along both sides of the tennis court, into one of which the balls are thrust by the retrieving arms and transported by one or more conveyor belts to one top end of the tennis court. The ball receiving channels have connections to a conveyor chute by which the balls are transported from the corners of the tennis court to a ball retriever placed in the middle of the top of the tennis court or to a ball retriever directly.

It would, therefore, be advantageous to provide a system for quickly gathering dead tennis balls from a tennis court with little or no human intervention using air directed along the surface of the tennis court. It would be further advantageous to have features within the ball gathering system to dry the surface of a tennis court after rain or other deposition of moisture on the tennis court surface.

DISCUSSION OF THE RELATED ART

Several attempts to provide apparatus to gather dead tennis balls from around a tennis court upon completion of a match or practice session are found in the prior art. For example, U.S. Pat. No. 3,203,696 for GAME APPARATUS issued Aug. 31, 1965 to Hermon R. Sawyer teaches a U-shaped conveyor system for collecting tennis balls from both halves of a tennis court.

U.S. Pat. No. 3,819,049 for BALL RETRIEVING APPARATUS issued Jun. 25, 1974 to Frances Koerner et al. discloses a ball retrieving apparatus having a receptacle having a base provided with wheels, a storage chamber for balls to be picked up by suction through the mouth at the end of a hose connecting into the chamber, a screen floor for the chamber and a drawer below the chamber to collect debris from the collected balls and a suction or vacuum creating means in the receptacle, for use of the apparatus in picking up tennis balls, for example.

U.S. Pat. No. 4,116,192 for TENNIS BALL RETRIEVER issued Sep. 26, 1978 to Jack C. Scott provides a tennis ball retriever and ball transporter for retrieving tennis balls from a collection point on a court surface and transporting the balls to a ball throwing machine. The machine comprises a pinwheel having sawtooth projections enclosed by a circular wall, with a tube extending through the wall in alignment with the movement of balls around the periphery of the wall, and an electric motor for rotating the pinwheel. As balls drop into open regions between the pinwheel projections and the wall, they are engaged by the projections and driven around the periphery of the wall into the open end of the tube. The opposite end of the tube extends to the ball throwing machine, which may be disposed on top of the retriever.

U.S. Pat. No. 4,116,436 for BALL•COLLECTING APPARATUS issued Sep. 26, 1978 to Gunnar Bjorhn teaches an apparatus for collecting tennis balls on a tennis court half comprising two ribs, one rib of which is normally located along each of two opposite edges of the court half. Drive means are arranged to displace the ribs toward each other while conveying balls on the court surface, thereby to collect the balls in a limited area, and then to return the ribs to their normal position. Control means are arranged to control the drive means. The control means are preferably actuatable by the player from a position located within the limited ball-collecting area.

U.S. Pat. No. 4,422,632 for TILTABLE TENNIS COURT issued Dec. 27, 1983 to Pierre Trottet discloses a panel mounted on a frame which in turn is mounted on a pivot disposed parallel to the longitudinal axis of the panel. Jacks connected to the frame permit tilting the panel which constitutes the tennis court. In this inclined position of the panel, rainwater will not accumulate on the court and the court can be reused as soon as the rain ceases to fall.

U.S. Pat. No. 4,575,081 for TENNIS BALL RETRIEVING SYSTEM issued Mar. 11, 1986 to Peter A. Cavanagh provides a tennis ball recovery system for use in a full court utilizing an inelastic flexible damping screen hooked onto the back fence of the tennis court, which intercepts the driven ball and drops it onto a resilient apron that extends away from a collection trough. Within the trough there is located a conveyor that will move the balls toward the center of the trough and substantially central in the trough a conduit is provided with positive pressure to move the ball into a conduit and into a receptacle.

U.S. Pat. No. 5,125,654 for TENNIS BALL RETRIEVING SYSTEM issued Jun. 30, 1992 to Wilbert Bruno teaches a retrieving system extending from the base line to the tennis net on a tennis court and can be moved along the net. During the retrieving process, the retrieving arm moves only one time during each passage in a transverse direction over one half of the tennis court. The retrieving arm continues its movement until it reaches one side edge of the tennis court. Ball receiving channels are provided along both sides of the tennis court, into one of which the balls are thrust by the retrieving arms and transported by conveyor belts to one top end of the tennis court. The ball receiving channels have connections to a conveyor chute by which the balls are transported from the corners of the tennis court to a ball retriever placed in the middle of the top of the tennis court or to a ball retriever directly. The retrieving arm is preferably guided only at one end thereof by a guide rail extending along the top of the tennis court.

U.S. Pat. No. 6,050,625 for TABLE TENNIS BALL RETRIEVING AND DISPENSING SYSTEM issued Apr. 18, 2000 to Charles Richard Nisbet discloses a system for managing table tennis balls facilitates retrieval of stray balls, stores them and dispenses them conveniently to a player as required. The system has two main components: a ball retriever, a.k.a. the BallSnatcher, and a storage rack, a.k.a. the BallFeeder. The tubular retriever can hold a column of balls and is deployed in a hand-held manner in a vertical orientation from a standing position. The retriever is fitted at its bottom end with a ball trap including (a) a flexible coaxial constriction ring defining an expandable entry opening that when lowered over a stray ball captures and retains it in the retriever tube, and (b) a flexible coaxial guidance flange extending outwardly and downwardly to provide initial guidance in retrieving a stray ball. The tubular storage rack is mounted below the playing surface of a game table at a low angle; an open upper end is located along one side of the table where it can receive balls in an easy transfer from the retriever, while the opposite lower end is fitted with an end stop/dispenser, located at an end of the table convenient to a player, that retains the balls in the rack and dispenses them one at a time as required for play. The storage tube is sized to receive the open top end of the retriever for ball transfer; furthermore, the retriever can be inserted telescopically into the storage tube and left conveniently stored in this manner, ready to be easily pulled out for deployment U.S. Pat. No. 6,834,776 for TENNIS BALL RETRIEVING DEVICE issued Dec. 28, 2004 to Lynne Corvese shows a tennis ball retrieving apparatus wherein the tennis balls roll into the gutter portion of the device and an electronically controlled and powered paddle moves them into a ball conveyor system that dispenses the balls into a ball hopper. The gutter portion consists of three sections that are connected to each other by pins. A front ball stationary plate which does not rotate with the conveyor wheel prevents the tennis balls from falling out the front side of the conveyor wheel until the wheel rotates clockwise and brings the ball upward to an opening within the rear stationary plate where the ball is free to fall into the ball hopper chute and into the hopper.

U.S. Pat. No. 7,114,877 for DRAINAGE SYSTEM FOR SPORTS FIELDS issued Oct. 3, 2006 to Dennis James Wilkerson teaches a system for draining bunkers on golf courses and other sports playing areas, and for draining landscaped areas. A receptacle is positioned below the surface for receiving drain water and for discharging the water through an outlet. A perforated pipe water collection system can be attached to the receptacle to direct water to the receptacle interior space. A receptacle cover is removable to permit access to the receptacle interior space. The cover is sufficiently strong to support the overlying weight of people and equipment, and can have apertures for permitting water entry while resisting entry of sand.

Published United States Patent Application No. 2006/0068948 for TENNIS BALL COLLECTION, DISPENSING, AND TRANSPORT APPARATUS published Mar. 30, 2006 upon application by Lloyd Mendoza provides a tennis ball collection, dispensing, and transporting apparatus that includes a ball collection hopper for collecting tennis balls by a wheel-mounted sweeping apparatus. The ball collection hopper includes a forward facing opening for receiving tennis balls collected by the sweeping apparatus, for directing tennis balls over a one-way deflection panel and into the interior of the ball collection hopper. The deflection panel prevents collected tennis balls from accessing the sweeping apparatus and jamming the collection device during use, as well as retaining collected tennis balls during transport on and off the tennis court, as well as for securing the balls within the hopper when being dispensed Published United States Patent Application No. 2009/0249640 for DEVICE AND METHOD FOR REMOVING WETNESS published Oct. 8, 2009 upon application by Zbigniew Sufleta discloses a device for removing wetness includes a frame having a slot, a sheet of fluid absorbing material, at least a portion of which is located in the slot, wherein the sheet has a first end and a second end, a first handle coupled to the frame, and a second handle coupled to the first end. A method for removing wetness on a surface includes placing a sheet of fluid absorbing material on a wet surface, and pulling a first end of the sheet relative to a slot in a first direction so that part of the sheet moves through the slot to remove moisture from the sheet.

None of the patents and published patent applications, taken singly, or in any combination are seen to teach or suggest the ball collection and court drying system for a tennis court or the like of the present invention.

SUMMARY OF THE INVENTION

In accordance with the present invention there is provided a pneumatic ball gathering system that quickly clears and gathers tennis balls or similar items from a tennis court or other similar venue. One or a series of spaced-apart discharge nozzles are connected to a plenum with optional intervening valves.

The plenum, one or more nozzles, and valves form a structure that is typically disposed underground when not in use and selectively raiseable when needed to clear balls or water from the tennis court. In one embodiment, the structure is located along one side edge of the tennis court. In a first alternate embodiment, the structure may be located under the net and be configured with one or more nozzles disposed to direct air in both directions away from the net. In a second alternate embodiment, the one or more nozzles are located along each side of the tennis court. Ball collection subsystems are located at each end of the tennis court.

A collection trough is disposed either at an opposite side away from the air source or, in the first and second alternate embodiments, at each end of the tennis court. The collection trough may be formed with a slope to cause collated balls to roll downward therein. It is also possible to provide a mechanical conveyor system in the collection trough or troughs to move collected balls to a predetermined location.

One or more vertical conveyors raise balls from the collection trough and discharge them into an appropriate container.

The system may be used without activating any of the conveying components to direct streams of air across the tennis court to facilitate drying the court after rain.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1H is an end, elevational schematic view of an alternate embodiment of a ball barrier in a closed, inoperative position;

FIG. 1I is an end, elevational schematic view of an alternate embodiment of a ball barrier in an open, operational position;

FIG. 3C is a side elevational schematic view of the a shutter type valve system with the; shutter closed of FIG. 3A;

FIG. 3D is a side elevational schematic view of the a shutter type valve system with the; shutter open of FIG. 3B;

DETAILED DESCRIPTION OF THE PREFERRED EMBODIMENTS

The present invention provides a ball gathering and court drying system for installation in a tennis court or the like.

Figure 1A:
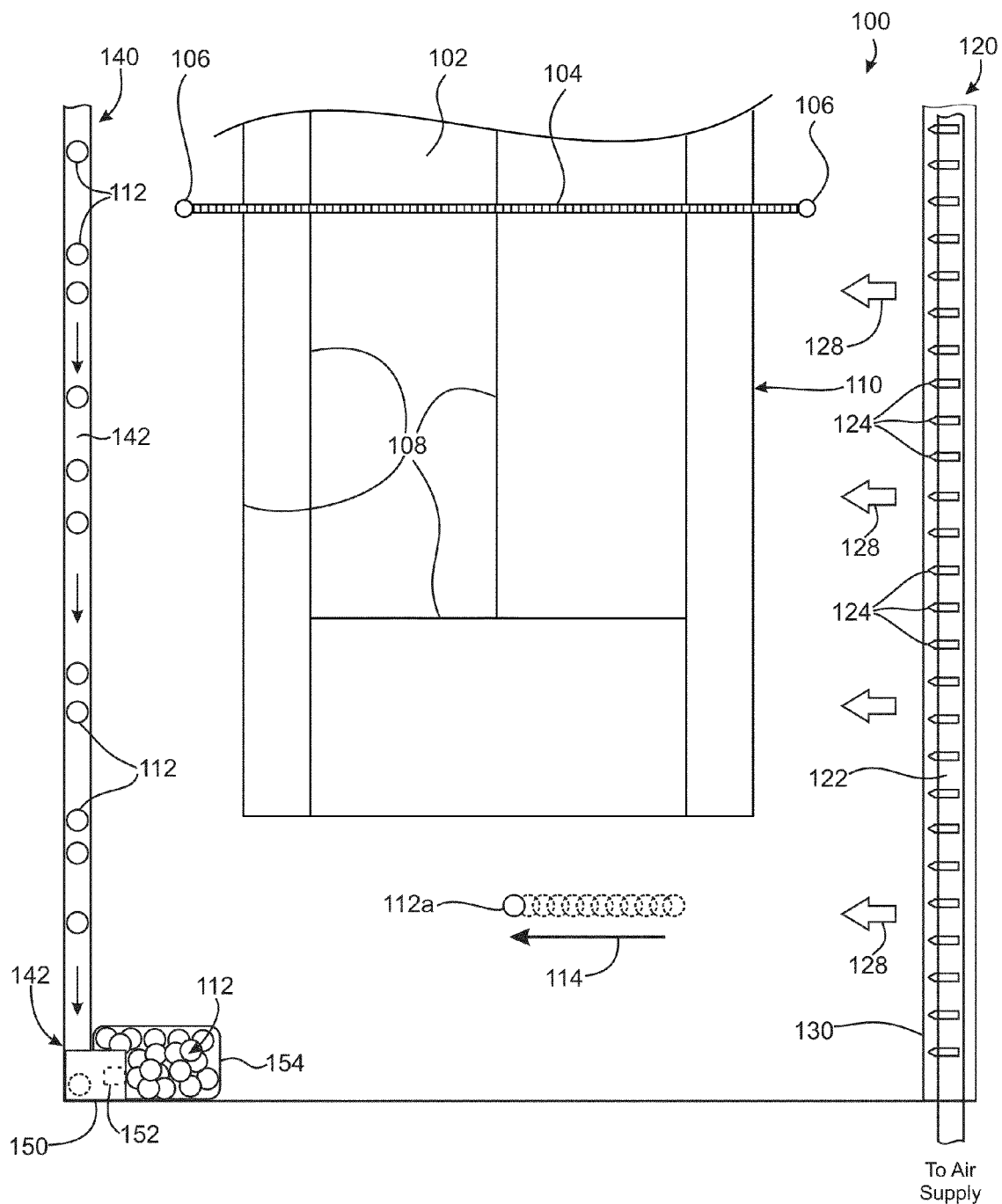
FIG. 1A is a top plan, schematic view of a portion of a tennis court with a simplified representation of a first embodiment of the ball gathering and court drying apparatus in accordance with the invention.

Referring first to FIG. 1A, there is shown a top plan, schematic view of a portion of a tennis court with a simplified representation of a first embodiment of the ball gathering and court drying apparatus in accordance with the invention, generally at reference number 100.

A portion of a tennis court 102 having a net 104 supported by support posts 106 is shown schematically. Tennis court 102 has various markings 108 disposed on an upper surface thereof. None of tennis court 102, net 104, support posts 106, or markings 108 form any part of the invention but are included to illustrate the intended operating environment for the ball gathering and court drying system in accordance with the invention.

An air supply sub-system 120 is disposed along a right edge 110 of tennis court 102 and is substantially parallel to right edge 110. As discussed in more detail hereinbelow, air supply system is designed for installation beneath the surface of tennis court 102.

Air supply sub-system 120 has an air supply plenum 122 disposed therealong. One or a series of nozzles 124 are spaced along and connected to plenum 122. Plenum 122 is typically a cylindrical pipe having a relatively large diameter to minimize air pressure drop therealong. It will be recognized that a tapered plenum could be substituted to also control pressure drop. Consequently, the invention is not considered limited to any particular plenum cross-sectional geometry. The invention is intended to include rather any plenum cross-sectional geometry.

Figure 3A:
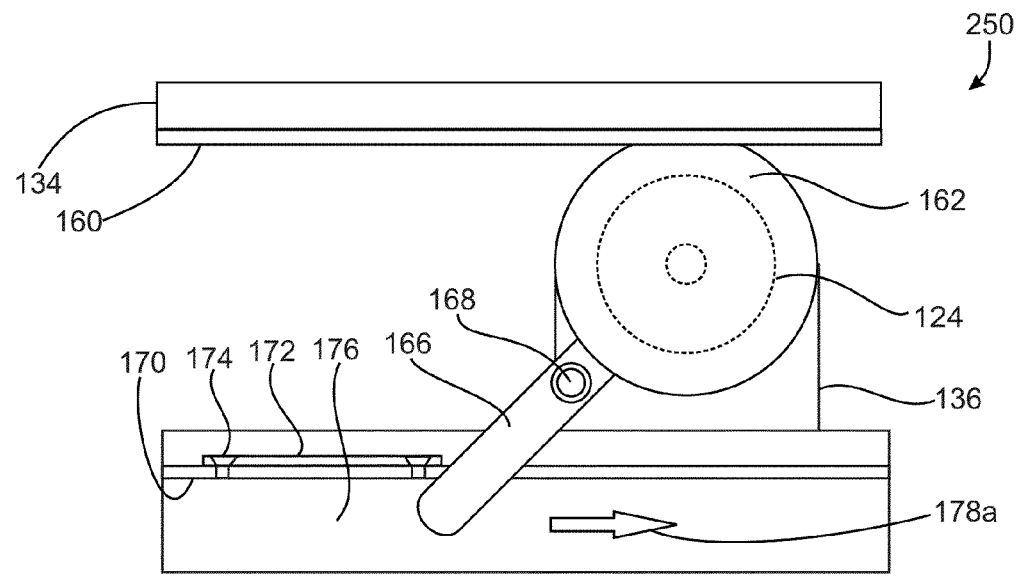
FIG. 3A is a front elevational schematic view of a shutter type valve system with the; shutter closed.
Figure 3B:
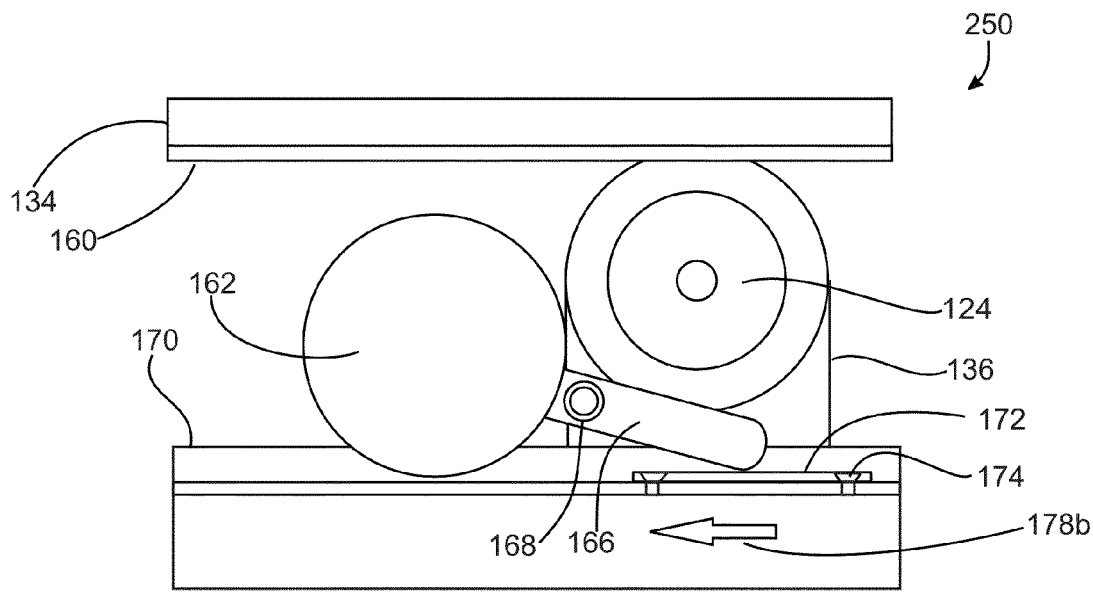
FIG. 3B is a front elevational schematic view of a shutter type valve system of FIG. 3A with the shutter open.
Figure 4:
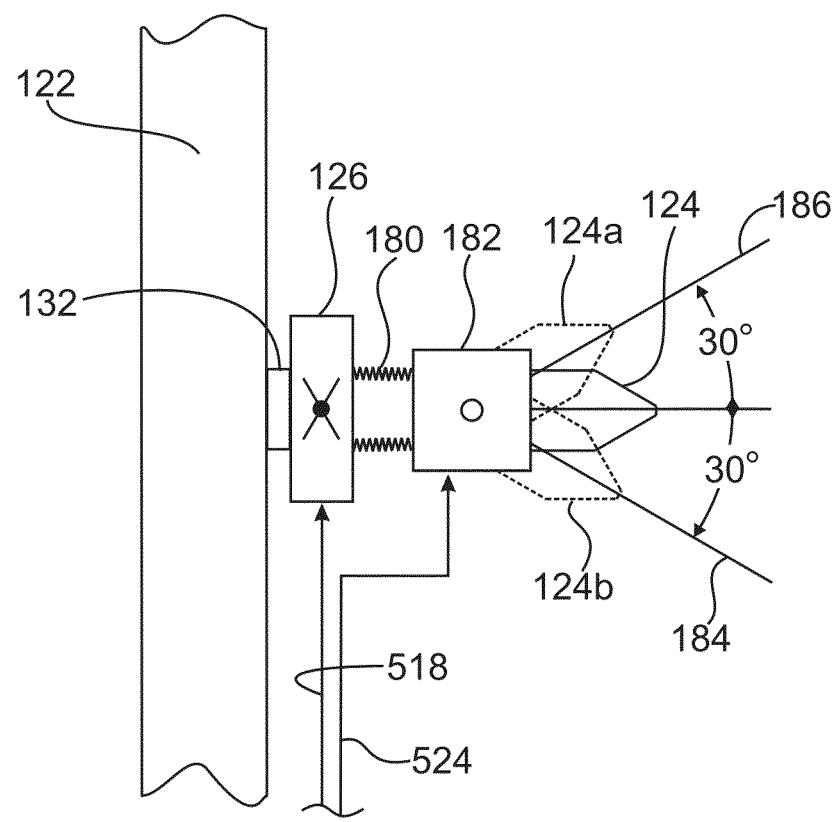
FIG. 4 is a top plan, schematic view of a single nozzle attached to a rotation mechanism.

Valves 126, best seen in FIG. 4 as well as FIGS. 3A-3D are inserted between plenum 122 and one or more nozzles 124.

Air, represented schematically by arrows 128 is forced out of one or more nozzles 124 in a direction parallel to the major axis, not specifically identified of one or more nozzles 124. Air 128 pushes any balls 112 across tennis court 102. A single ball 112*a* is shown schematically on tennis court 102 in a multi-image dashed pictogram depicting ball 112*a*'s movement across the tennis court 102 in the direction shown by arrow 114.

The air supply apparatus 120 is housed in a trough 130 of sufficient width and depth to contain plenum 122 and one or more nozzles 124 as well as a lift mechanism, best seen in FIGS. 2A and 2B and discussed in detail hereinbelow.

A ball collection sub-system 140 is disposed at the left edge, not specifically identified, of tennis court 102. Ball collection system 140 is aligned substantially parallel to air supply sub-system 120.

Figure 1B:
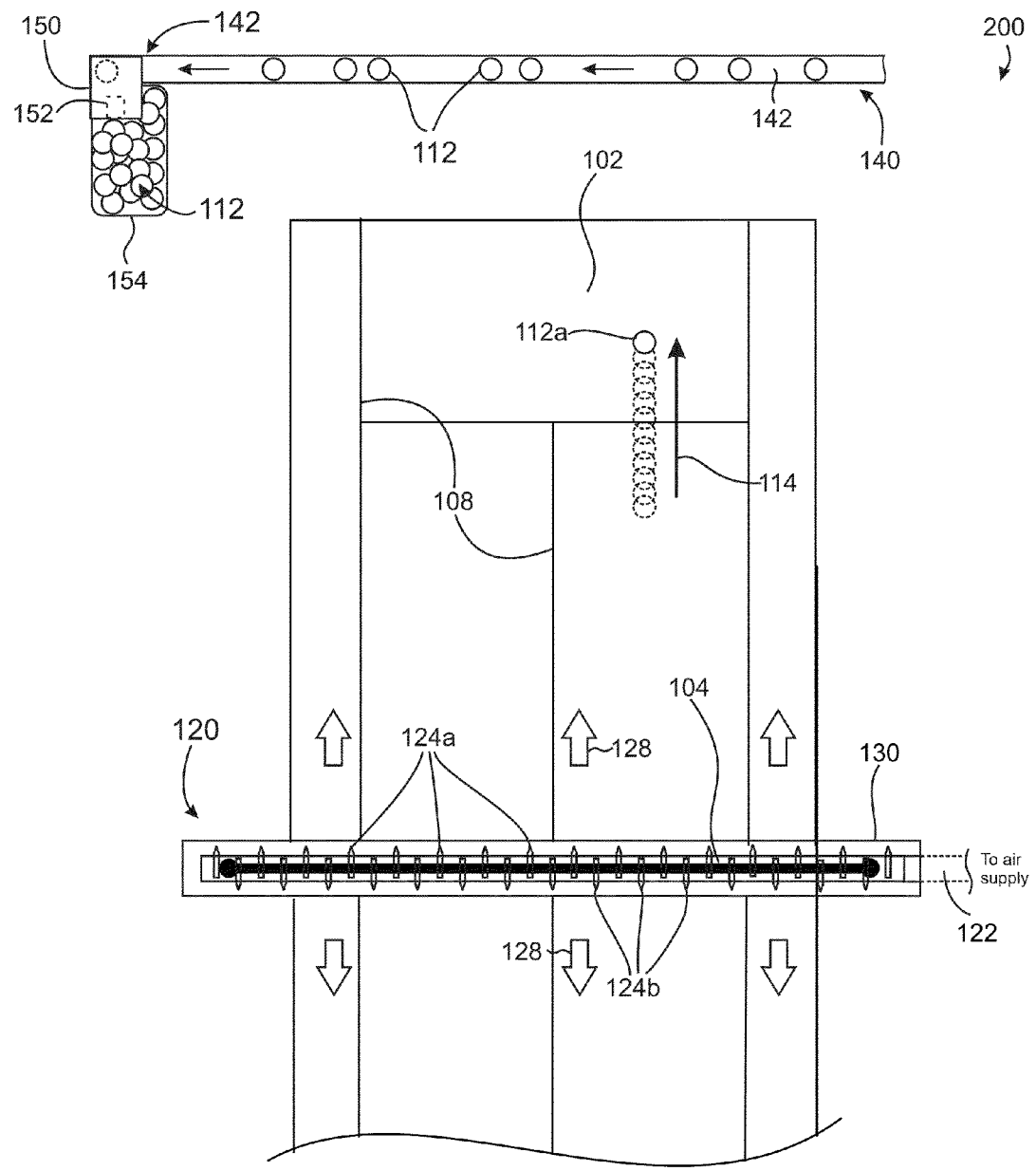
FIG. 1B is a top plan, schematic view of a portion of a tennis court with a simplified representation of a second embodiment of the ball gathering and court drying apparatus in accordance with the invention.
Figure 1C:
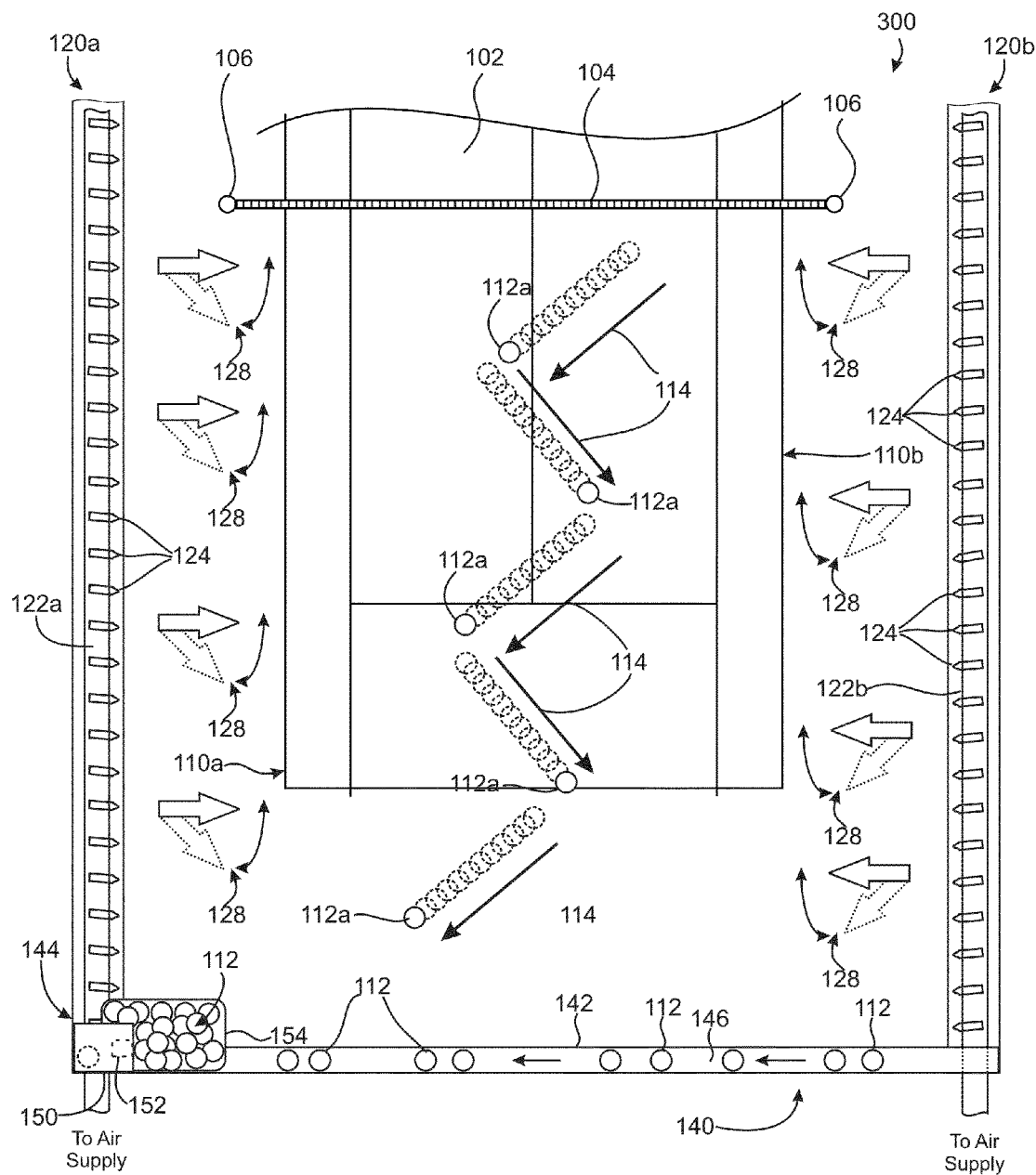
FIG. 1C is a top plan, schematic view of a portion of a tennis court with a simplified representation of a third embodiment of the ball gathering and court drying apparatus in accordance with the invention.
Figure 1D:
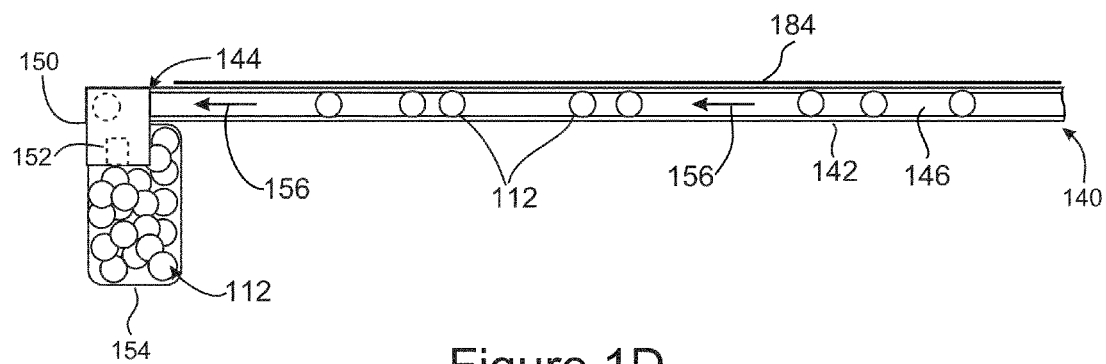
FIG. 1D, is a top plan, schematic view of a belt conveyor.

Ball collection sub-system 140 may be implemented as a simple trough 142 downwardly slopping toward a vertical ball conveyor system 150 or, in alternate embodiments, as a mechanical conveyor 146, best seen in FIG. 1D that moves balls 112 toward vertical conveyor 150.

A vertical conveyor 150 at the terminus 142 of trough 140 and, when present, the terminus of horizontal conveyor 146, best seem in FIG. 1D, accepts balls 112 and lifts them upward to a discharge chute 152 where they are discharged into a ball container 154.

Referring now also to FIG. 1B, there is shown a first alternate embodiment of the ball gathering and court drying apparatus in accordance with the invention, generally at reference number 200.

Ball gathering and court drying system 200 is similar to system 100 of FIG. 1A in most respects.

A portion of a tennis court 102 having a net 104 supported by support posts 106 is shown schematically. For clarity, net 104 is shown as a solid line and posts 106 are not labeled in FIG. 1B. Tennis court 102 has various markings 108 disposed on an upper surface thereof. None of tennis court 102, net 104, support posts 106, or markings 108 form any part of the invention but are included to illustrate the intended operating environment for the ball gathering and court drying system 200 in accordance with the invention.

An air supply sub-system 120 is disposed under net 104. Like in system 100 of FIG. 1A, air supply system 120 is designed for installation beneath the surface of tennis court 102.

Air supply sub-system 120 has an air supply plenum 122 disposed therealong. A first series of one or more nozzles 124*a* pointing in a first direction away from net 104 are interspersed with a second series of one or more nozzles 124*b* pointing in an opposite direction relative to the first series of one or more nozzles 124*a*. One or more nozzles 124*a* and 124*b* are spaced along and connected to plenum 122. Plenum 122 is typically a cylindrical pipe having a relatively large diameter to minimize air pressure drop therealong.

Valves 126, best seen in FIG. 4 as well as FIGS. 3A-3D, are inserted between plenum 122 and one or more nozzles 124 exemplified by nozzles 124*a*, 124*b*.

Air, represented schematically by arrows 128 is forced out of one or more nozzles 124*a*, 124*b* in directions perpendicular net 104. Air 128 pushes any balls 112 along tennis court 102. A single ball 112*a* is shown schematically on tennis court 102 in a multi-image dashed pictogram depicting ball 112*a*'s movement along tennis court 112*a* in the direction shown by arrow 114.

The air supply apparatus 120 is housed in a trough 130 of sufficient width and depth to contain plenum 120 and one or more nozzles 124*a*, 124*b* as well as a lift mechanism, best seen in FIGS. 2A and 2B and discussed in detail hereinbelow.

A ball collection sub-system 140 is disposed at each end of tennis court 102, only one shown in FIG. 1B. Ball collection systems 140 are aligned substantially parallel to air supply sub-system 120.

Ball collection sub-systems 140 may be implemented as simple troughs 142 downwardly slopping toward a vertical ball conveyor system 150. In alternate embodiments, a mechanical conveyor 142, best seen in FIG. 1D, may be used to move balls 112 toward vertical conveyor 150.

It will be recognized that the nozzle configuration as shown in FIG. 1B may be combined with the arrangement shown in FIG. 1A disposed parallel to the edge of tennis court 102. Such an arrangement could be used to clear balls or water from two adjacent tennis courts, not shown.

Referring now also to FIG. 1C, there is shown a second alternate embodiment of the ball gathering and court drying apparatus in accordance with the invention, generally at reference number 300.

Ball gathering and court drying system 300 is similar in some respects to portions of both systems 100 and 200 of FIGS. 1A and 1B, respectively.

A portion of a tennis court 102 having a net 104 supported by support posts 106 is shown schematically. None of tennis court 102, net 104, or support posts 106, form any part of the invention but are included to illustrate the intended operating environment for the ball gathering and court drying system 300 in accordance with the invention.

An air supply sub-systems 120*a*, 120*b* are disposed along a respective left edge 110*a* and a right edge 110*b* of tennis court 102 and are substantially parallel to left and right edges 110*a*, 110*b*. As discussed in more detail hereinbelow, air supply systems 120*a*, 12*b* are designed for installation beneath the surface of tennis court 102.

Each air supply sub-systems 120*a*, 120*b* has an air supply plenum 122*a*, 122*b* disposed therealong. A series of one or more nozzles 124 are spaced along and connected to air plenums 122*a*, 122*b*. Plenums 122*a*, 122*b* are typically cylindrical pipes having a relatively large diameter to minimize air pressure drop therealong. It will be recognized that a tapered plenum could be substituted to also control pressure drop. Consequently, the invention is not considered limited to any particular plenum cross-sectional geometry. The invention is intended to include rather any plenum cross-sectional geometry.

Valves 126, best seen in FIG. 4 as well as FIGS. 3A-3D are inserted between plenum 122 and one or more nozzles 124. Also a shown in FIG. 4, one or more nozzles 124 are adapted to sweep from left to right in a plane substantially parallel to the upper surface, not specifically identified, of tennis court 102. Typically, valves 126 are used to selectively supply air from respective air plenums 122a, 122b to valves 124. By synchronizing the supply of air with the sweeping motion of the valve, balls may effectively be swept from tennis court 102 for collection by a ball collection sub-system 140 disposed at each end, neither specifically identified, of tennis court 102, Sweeping motion and selective supply of air to the valves is controlled by control system 500, best seen in FIG. 6.

The air supply apparatuses 120a, 120b are housed in troughs 130a, 130b, respectively, of sufficient width and depth to contain plenums 122a, 122b and nozzles 124 as well as a lift mechanism, best seen in FIGS. 2A and 2B and discussed in detail hereinbelow. In this embodiment, air may be alternately supplied to plenums 120a, 120b, typically in short bursts.

Air, represented schematically by arrows 128 is forced out of one or more nozzles 124 in a direction depending upon the particular rotated position of one or more nozzles 124 at any particular point in time. One or more nozzles 124 typically move between two extreme positions: (a)—a very small angle relative to the net, i.e. almost parallel to the net, typically 3-5°; and (b) almost perpendicular to the net, typically 45-85° with respect thereto. It will be recognized that other ranges of nozzle rotation may be chosen to meet a particular operating circumstance or environment and the invention is not considered limited to the specific range of rotation chosen for purposes of disclosure, Air 128 pushes any balls 112 down the tennis court 102 (i.e., away from the net towards ball collection sub stems 140 at each end of tennis court 102). The travel of tennis balls is anticipated to in zigzag patterns generally away from the net 104 and towards ball collection sub-systems 140 at each end of tennis court 102. A single ball 112a is shown schematically on tennis court 102 in a multi-image dashed pictogram depicting ball 112a's zigzag movement towards the end of tennis court 102 in the direction shown by arrows 114.

A ball collection sub-system 140 is disposed at the bottom edge, not specifically identified, of tennis court 102. Ball collection system 140 is aligned substantially perpendicular to air supply sub-system 120.

Ball collection sub-system 140 may be implemented as a simple trough 142 downwardly slopping toward a vertical ball conveyor system 150 or, in alternate embodiments, as a mechanical conveyor 146, best seen in FIG. 1D that moves balls 112 toward vertical conveyor 150. It should be noted that in the embodiment of FIG. 1C, balls 112 moving along trough 142 must pass under ball container 154. As methods of elevating ball container 154 to provide clearance for balls 112 to pass beneath it are considered to be well known to those of skill in the art, such methods or mechanisms are not further discussed herein, A vertical conveyor 150 at the terminus 144 of trough 142 and, when present, the terminus of horizontal conveyor 146, best seem in FIG. 1C, accepts balls 112 and lifts them upward to a discharge chute 152 where they are discharged into a ball container 154.

Figure 1E:
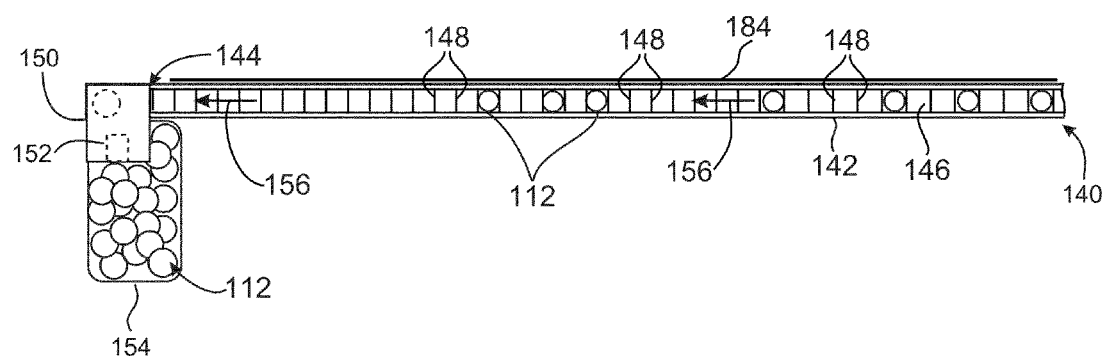
FIG. 1E is a top plan, schematic view of a cleated belt conveyor.

Referring now also to FIGS. 1D and 1E, there are shown top plan, schematic views of a belt conveyor and a cleated conveyor system, respectively. In alternate embodiments, ball collection sub-system 140 may include a conveyor 146, to move balls 112 along in a direction indicated by arrows 156. Such conveyors overcome possible problems with rubbish build up in trough 142. In FIG. 1D a belt conveyor 146 is disposed in trough 142. In FIG. 1E, a cleated belt conveyor having cleats 148 disposed on the belt conveyor 146 to provide positive drive to balls 112 as they are moved along the horizontal conveyor in the direction shown by arrows 156. It will be recognized that horizontal ball conveyor systems shown in FIGS. 1D and 1E are also applicable to the first embodiment of the ball collection and court drying system on FIG. 1A.

A ball barrier 184 or 186 is disposed proximate either an outside edge of trough 142 (FIGS. 1F and 1G) or within trough 142 (FIGS. 1H and 1I).

A vertical conveyor 150 at the terminus 144 of trough 140 accepts balls 112 and lifts them upward to a discharge chute 152 where they are discharged into a ball container 154. It is assumed that identical vertical conveyors 150 are disposed at each end of the tennis court. It will be recognized that a single vertical conveyor may be located at just one end of tennis court 102 and a ball conveying system, either above ground or beneath ground, neither shown, may be used to transfer collected balls 112 from a first trough 142 at a first end of tennis court 112 to the second trough 142 at an opposite end of tennis court 102.

The plenum 122, nozzles 124, 124a, 124b, and valves 126 form an air distribution system structure that is typically disposed underground when not in use and selectively elevatable when needed to clear balls or water from the tennis court.

Figure 1G:
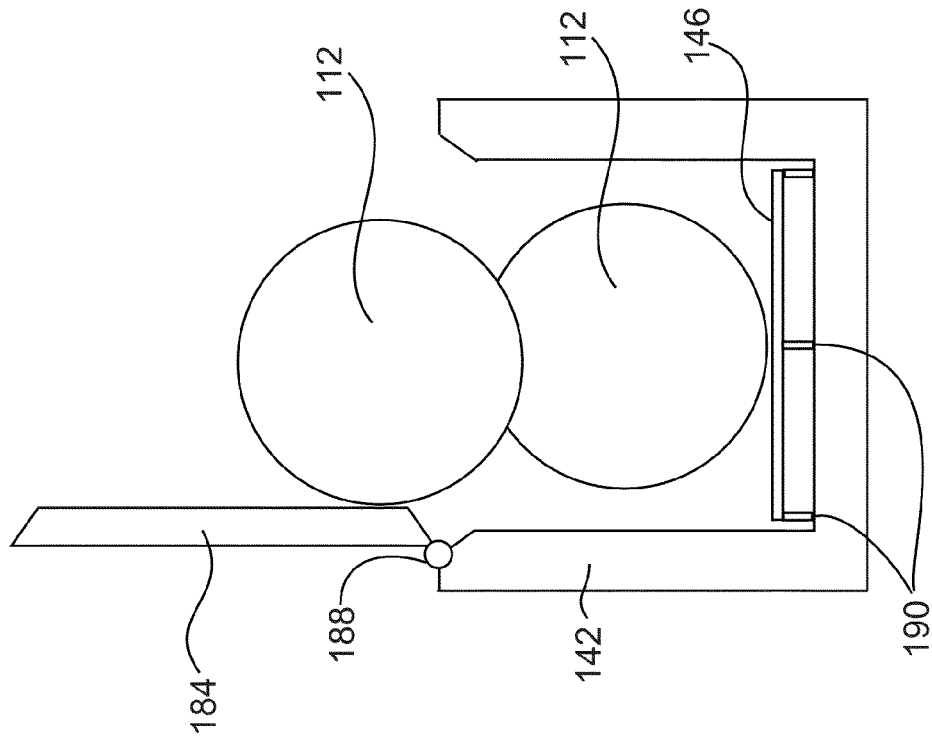
FIG. 1G is an end, elevational schematic view of a ball barrier in a raised, operational position.
Figure 1F:
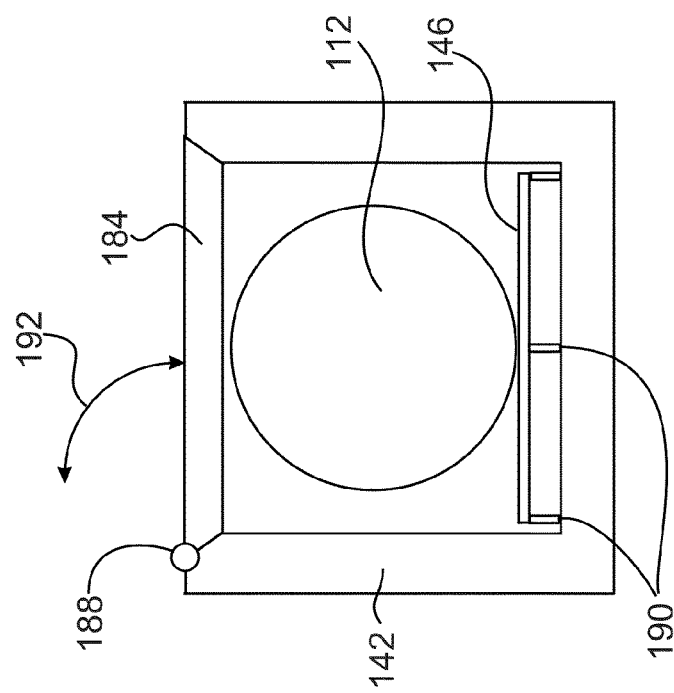
FIG. 1F is an end, elevational schematic view of a ball barrier in a lowered, inoperative position.

Referring now also to FIGS. 1F and 1G, there are shown end elevational, schematic views of a first embodiment of a ball barrier 184 in a closed, inoperative position and an open, operative position, respectively.

Ball barrier 184 is pivotally disposed over trough 142 (FIG. 1G) at a pivot or hinge 188. When required to stop balls 112 from rolling beyond trough 142, it may be rotated upwardly to a substantially vertical position as shown in FIG. 1G. While no specific mechanism is show for moving ball barrier 184 from a closed to an open position, it is believed that such mechanisms are well known to those of skill in the art and as such, the mechanism in not further described or discussed herein.

Referring now also to FIGS. 1H and 1I, there are shown end elevational, schematic views of a second embodiment of a ball barrier 186 in a lowered, inoperative position and an raised, operative position, respectively.

Ball barrier 186 is disposed within trough 142 (FIG. 1H) in a lowered, inoperative position. When required to stop balls 112 from rolling beyond trough 142, it may be raised vertically to an operative position as shown in FIG. 1I. While no specific mechanism is show for lifting ball barrier 186 from a lowered to a raised position, it is believed that such mechanisms are well known to those of skill in the art and as such, the mechanism in not further described or discussed herein.

Figure 2B:
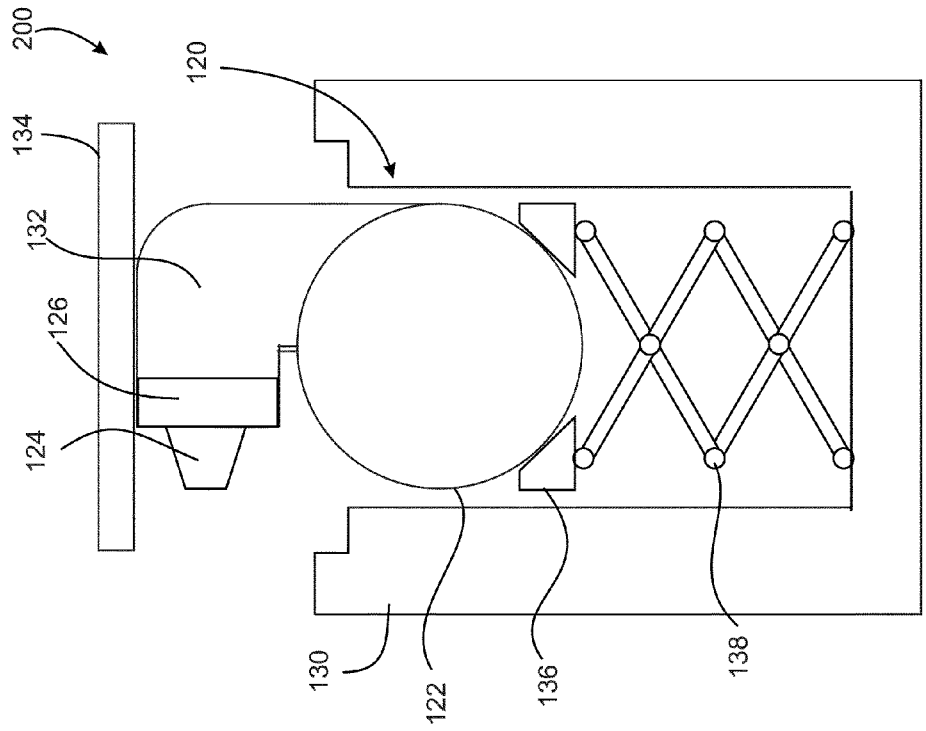
FIG. 2B is a side elevational, cross-sectional, schematic view of the single nozzle, valve, plenum of FIG. 2A in a raised, operational position.
Figure 2A:
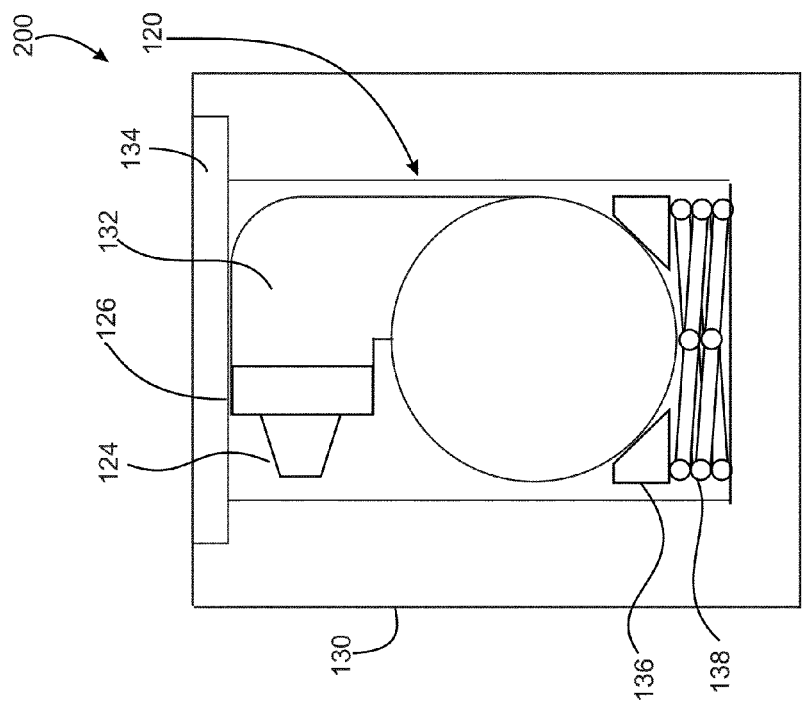
FIG. 2A is a side elevational, cross-sectional, schematic view of a single nozzle, valve, and plenum in a lowered, non-operative position.

Referring now also to FIGS. 2A and 2B, there are shown side elevational, cross-sectional, schematic views of a single nozzle 124, valve, 126, and plenum 122, generally at reference number 200. Valve 126 is connected to air plenum 122 by a plenum outlet pipe 132.

FIG. 2A shows nozzle assembly 200 in a lowered, non-operational position while FIG. 2B shows nozzle assembly 200 in a raised, operational position.

A trough 130 houses the plenum 122, plenum outlet pipes 132, valves 126, and one or more nozzles 124 on a lifting mechanism 138. A lifting cradle 136 is interposed between lifting mechanism 138 and plenum 122.

A cover 134 sized and configured to seal trough 130 when the air supply sub-system 120 is in a lowered, non-operational position. Cover 134 rests on cutaway areas in the top of trough 130 and is adapted to be substantially flush with the surface of tennis court 102.

As is seen in FIG. 2B, air supply sub-system 120 is shown in an elevated, operational position.

Lift mechanism 138 may be implemented in many ways known to those of skill in the art. A simple scissor jack type mechanism is shown for purposes of disclosure. While no power source is shown operably connected to lift mechanism 138, it will be further recognized that an electric motor, a pneumatic motor, a hydraulic motor, or other types of actuators believed to be well known may be used to selectively actuate lift mechanism 138. Consequently, the invention is not considered limited to the scissor jack type lift mechanism. Rather, the invention includes any and all suitable lift mechanisms. Likewise, the invention is not considered limited to any particular actuator operably connected to lift mechanism 138. Rather the invention includes any and all suitable actuating mechanisms.

Valves 126 may be implemented as electrically, pneumatically, or hydraulically actuated solenoid valves or as other types of valve. One possible valve construction is a movable shutter selectively placed in front of nozzles 124 to block or moderate the flow of air from one or more nozzles 124.

Valves 126 may be connected for individual actuation or, in alternate embodiments, valves may be grouped so that multiple valves are actuatable.

Referring now also to FIGS. 3A and 3B, there are shown front elevational schematic views of a representative shutter valve, generally at reference number 250.

In FIG. 3A, a shutter 162 is shown in a closed position thereby blocking the air flow from a nozzle 124. In FIG. 3B, shutter 162 is shown in an open position whereby air may escape from nozzle 124.

A lip 160 along a major axis of trough cover 134 stabilizes shutter 162 while in a closed position as seen in FIG. 3A.

A lever 166 is operatively connected to shutter 162. A pivot 168 in lever 166 allows shutter 162 to rotate thereabout in response to movement of lever 166.

A lever actuation band 170 extends along an upper surface of a base 176, typically forming part of plenum lifting cradle 136. A lever-engaging plate 172 is affixed to an upper surface of lever actuation band 170, typically with screws 174 or other fasteners. It will be recognized that other attachment methods such as adhesive fastening, welding, or other type of fasteners may be substituted for screws 174 used for purposes of disclosure.

Base 176, supports a lever 166 rotatable on a pivot 168. Lever 166 has a shutter disc 162 attached to a distal end thereof. Moving the proximal end of lever 168 by moving lever-engaging plate 172 affixed to an upper surface of lever actuation band 170 in a direction shown by arrow 178a causes shutter 162 to move from a closed position as seen in FIG. 3A to an open position as shown in FIG. 3B.

Shutter 162 is moved from a closed position to an open position by moving lever actuation band 170 and lever-engaging plate 172 in a direction shown by arrow 178b.

Lever actuation band 170 is operably connected to an actuator, not shown, that is disposed to reciprocally move lever actuating band 170 as shown by arrows 178a and 178b. It will be recognized that actuators may be implements as bi-directional pneumatic or hydraulic cylinders; electrical solenoid arrangements, linear stepper motors, and other electrically, pneumatically, or hydraulically powered actuators. Such actuators are believed to be well known to those of skill in the art and, consequently, are not further described or discussed herein.

In still other embodiments, the actuation system might be designed wherein shutters 162 are maintained in a closed position by one or more springs, not shown, and then opened by movement of shutter engaging plates 172 and shutter operating band 170. An embodiment wherein shutter operating band moved in only a single direction and as shutter engaging plates 172 moved past, the spring(s), not shown, returned shutters 168 to their nominally closed position. Actuation of shutter operating band may be simplified in that a simple electric motor may be utilized to move shutter operating band 170.

Referring now also to FIGS. 3C and 3D, there are shown side elevational views of the representative shutter valve of FIGS. 3A and 3B, respectively.

In all discussions heretofore, one or more nozzles 124 have been assumed to be fixed in a forward or rearward orientation. It is possible that one or more nozzles 124 be rotatable so as to reciprocally move across a certain arc, thereby facilitating "sweeping" balls 112 from the tennis court 102. Referring now also to FIG. 4, there is shown a top plan, schematic view of a nozzle 124 moveable from side to side.

Lawn sprinklers adapted for such reciprocal motion controlled by stops at each limit of the desired sprinkler head travel are believed to be well known. The implementation of such lawn sprinkler heads is believed to be transferable to one or more nozzles 124. It will be recognized that many other possibilities for sweeping some or all of one or more nozzles 124 across controlled arcs and any suitable mechanism for so doing may be substituted.

In FIG. 4, a nozzle 124 is attached to rotation mechanism 182 and is shown in an un-rotated, position pointing straight outward. Rotation mechanism 182 is operatively connected to a controller 502, best seen in FIG. 6, via a connection 524. A control signal, not shown, selectively applied by controller 502 via connection 524 causes nozzle 124 to move (i.e., sweep) between positions indicated by nozzles 124a and 124b shown in broken lines. While an angle of approximately plus or minus 30° from the straight forward position is shown in FIG. 4, it will be recognized that many other sweep angles may be chosen to meet a particular operating requirement. Consequently, the invention is not considered limited to the approximately plus or minus 30° sweep range chosen for purposes of disclosure. Rather, the invention is intended to cover any angular sweep range.

Rotation mechanism 182 is connected to a valve via a flexible connection 180. Valve 126 is shown with a connection 518 that provides a control signal from controller 502. While an electrically actuated valve is shown for purposes of disclosure, as discussed hereinabove, a pneumatically or hydraulically controlled and/or actuated valve may be substituted.

Consequently, the invention is not considered limited to the implementation chosen for purposes of disclosure but rather it is intended to include any and all suitable nozzle sweeping mechanisms.

Sweeping the nozzles may be useful for dislodging tennis balls close to air supply sub-system 120 but between nozzles. Sweeping the one or more nozzles may also be useful when the ball collection and court drying system is used in court drying only mode as discussed in more detail hereinbelow.

Figure 6:
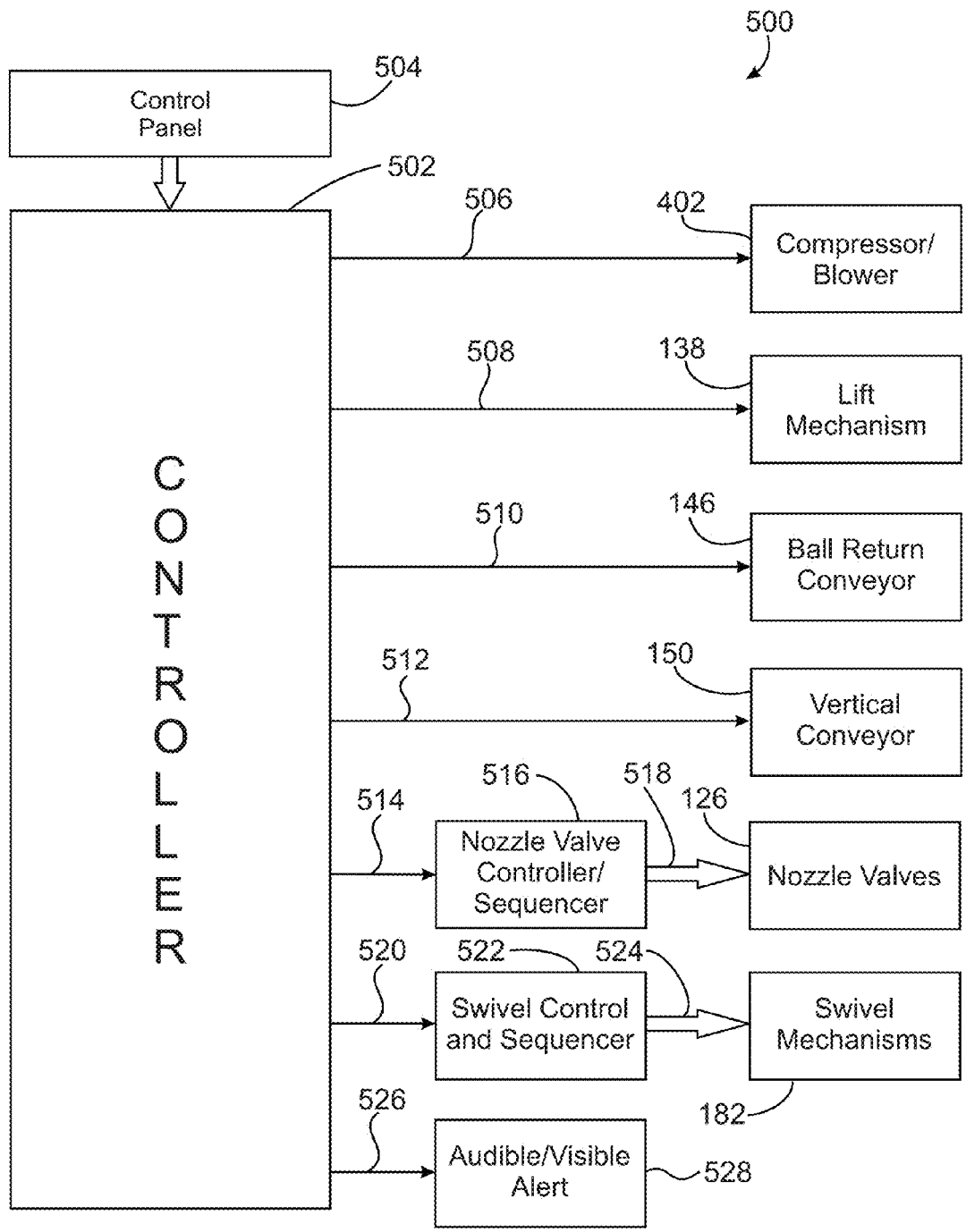
FIG. 6 is a block schematic diagram of a controller suitable to use with the ball collection and courts drying system in accordance with the invention.

Referring now also to FIG. 6, there is shown a greatly simplified system block diagram of the ball collection and tennis court drying system in accordance with the invention, generally at reference number 500.

Heretofore the air source for operating the ball collection and court drying system has not been discussed. In one embodiment, a large multi-stage centrifugal compressor may be used to supply large volumes of relatively low pressure air to plenum 120. With this type of air flow, the system could be operated continuously for several minutes to clear or dry the court.

In an alternate embodiment, the ball collection and court drying system could be operated in a "single shot" mode. In this type of operation, a large reservoir of relatively high pressure compressed air is created by one or more relatively small compressors. Once the reservoir is at an intended pressure, the air may be released to the one or more nozzles as a short blast at high pressure to clear and/or dry the court. In this embodiment, a large air reservoir is disposed away from plenum 122. It is possible to use the plenum 122 as part of the air reservoir to reduce the size of the external tank (i.e., reservoir). In alternate embodiments, it is possible to increase the size of plenum 122 so as to completely eliminate the need for an external tank altogether.

Figure 5A:
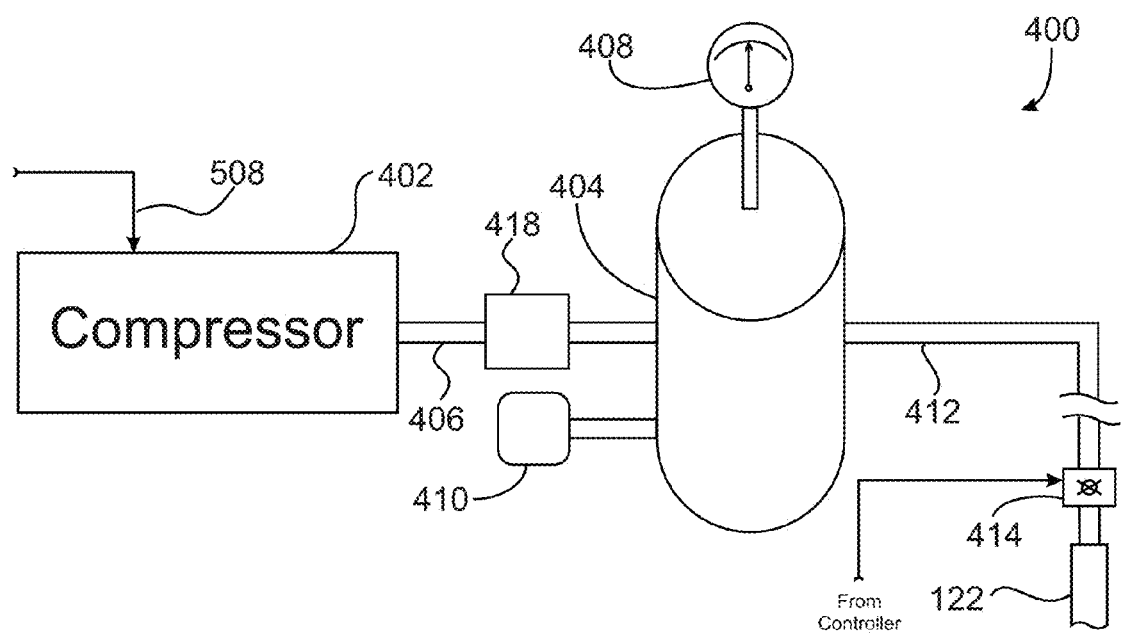
FIG. 5A is a simplified block schematic diagram of an air supply using an air compressor.

Referring now also to FIG. 5A there is shown a simplified system block diagram of a compressor-based air supply system, generally at reference number 400.

An air compressor 402 has an output connected to an output pipe 406 that is, in turn, connected to an air reservoir tank 404. A control signal 508 generated by master controller 502 is supplied to compressor 402. It will be recognized that compressor 402 requires a power source. An appropriate power source is assumed to be present and forms no part of the invention.

A pressure regulator 418 is generally inserted inline in output pipe 406. Typically, pressure regulator 418 will have an operative connection, not shown, to compressor 402.

An optional air pressure gauge 408 is connected to tank 404. In addition, a safety relief valve 410 is also connected to tank 404.

An output pipe 412 conducts air from air reservoir tank 404 to an optional "dump" valve 414. Dump valve 414 is selectively actuated in response to a signal received from master controller 502.

The air output from dump valve 414 is connected to air plenum 122.

Figure 5B:
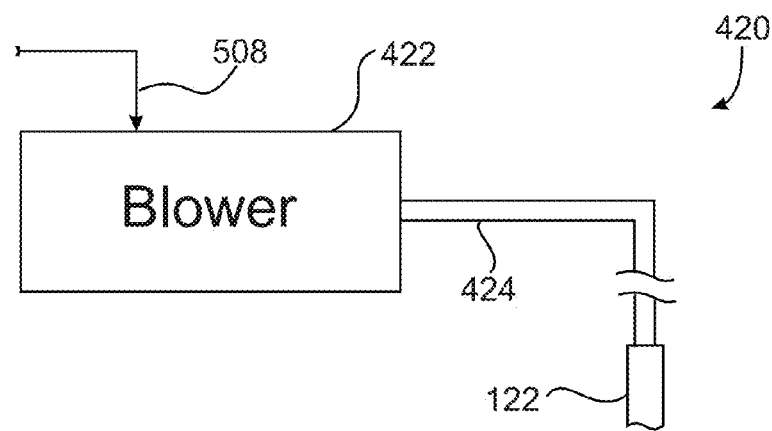
FIG. 5B is a simplified block schematic diagram of an air supply using a blower.

Referring now also to FIG. 5B, there is shown a simplified system block diagram of a blower-based air supply system, generally at reference number 420. The compressor 402 of FIG. 5A is replaced by a blower 422 in this embodiment. The need for a reservoir tank 404, a pressure gauge 406, and a pressure relief valve 410 is completely eliminated and the output of blower 422 is connected directly to air plenum 122 by an output duct 424.

A control signal 508 generated by master controller 502 is supplied to blower 422. It will be recognized that blower 422 requires a power source. An appropriate power source is assumed to be present and forms no part of the invention.

Referring now also to FIG. 6, there is shown a simplified system block diagram of a control system, generally at reference number 500. The entire ball collection and court drying system is operated by control system 500.

Figure 7:
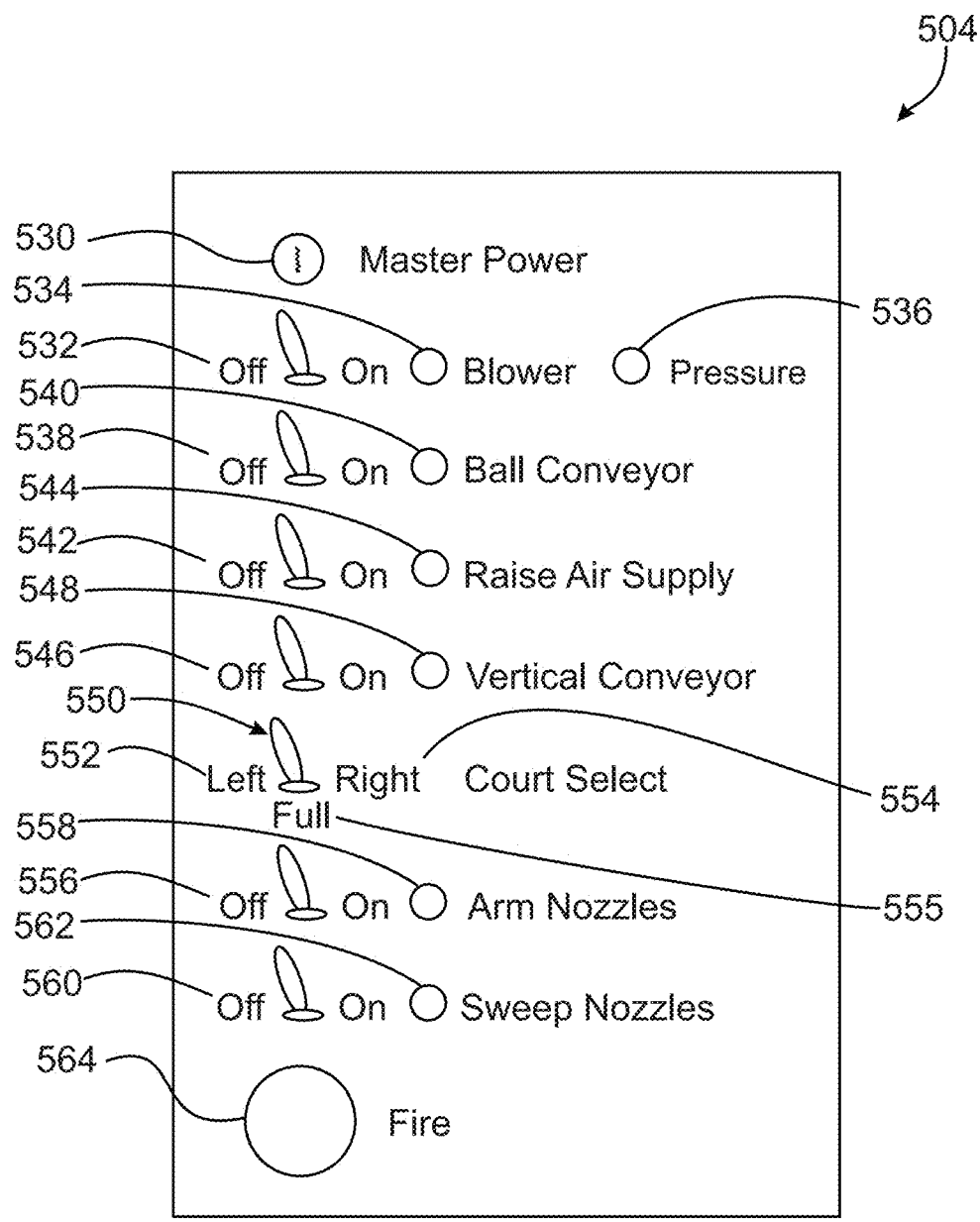
FIG. 7, is a schematic representation of a possible embodiment of a control panel for use with the controller of FIG. 6.

A master controller 502 is typically controlled by one or more control panels 504. It will be recognized that many possible configurations for control panel 504 interacting with master controller 502 are possible. For example, full control may be exercised from a control panel, not specifically identified, located in an office or other administrative facility with a control panel, not specifically identified, having only partial control and disposed near each tennis court. For purposes of disclosure, a single control panel 504 is shown schematically connected to master controller 502. Details of a typical control panel are shown in FIG. 7.

A control line 506 operatively connects compressor or blower 402 to master controller 502. A control line 508 operatively connects lift mechanism 138 to master controller 502. A control line 510 connects ball return conveyor 146 to master controller 502. A control line 512 connects vertical conveyor 150 to master controller 502.

A control line 514 connects master controller 502 to a nozzle valve controller/sequencer sub-system 516. Nozzle valve controller/sequencer is anticipated to be a programmable unit that defines the way air is applied to one or more nozzles 124 by controlling groups of valves 126. One function of nozzle valve controller/sequencer 516 is to control whether the full tennis court 102 or only a portion thereof is cleared. The court portion typically is one half the tennis court 102. Various patterns may be pre-programmed to control the sequence of air application to one or more nozzles 124 or groups of one or more nozzles 124.

An output bus 518 connects nozzle valve controller/sequencer 516 to individual valves 126, each valve 126 or preselected group of valves 126 having a conductor, not specifically identified, in output bus 518.

An output connector 520 connects master controller 502 to a swivel controller/sequencer 522 that controls the swivel mechanisms 182 associated with particular one or more nozzles 124. Like nozzle valve controller/sequencer 516, a swivel controller/sequencer 522 is anticipated to be a programmable unit that defines movement of individual or possible groups of nozzles 124. Swivel controller/sequencer 522 controls the sweep range by setting left and right swivel stop points, not specifically identified, for the angular movement of one or more nozzles 124.

An output bus 524 connects swivel controller/sequencer 522 to individual, rotation mechansims 182 or preselected groups of rotation mechansims 182 having a conductor, not specifically identified, in output bus 524.

Master controller 502 may incorporate an audible/visible alert 528 to notify persons in the vicinity of tennis court 102 when the ball gathering and court drying system is about to be activated. Such warning is appreciated when an implementation using a release of compressed air is in use as the sound of the air release may be relatively loud.

Referring now also to FIG. 7, there is shown a schematic representation of a possible embodiment of a control panel 504. Control panel 504 has a master switch 530, represented in FIG. 7 as a key switch.

A blower (or compressor in alternate embodiments) on-off switch 532 has indicator lamp 534 adjacent thereto. An additional indicator lamp 536 illuminates when a compressed pressure in reservoir tank 404 is sufficient to perform a single shot air release.

Another switch 538 turns horizontal ball conveyor 146 on and off. An indicator lamp 538 indicates when horizontal ball conveyor 146 is operating.

A switch 542 raises and lowers air supply sub-system 120. An indicator lamp 544 illuminates when air supply sub-system 120 is raised.

A court selection switch 550 allows selection of left half 552, full court 555, and right court 554 operation A switch 556 "arms" the nozzles. An indicator lamp 158 illuminates when the nozzles are armed to allow a single shot release of air to be triggered. The arming operation could include moving shutter 162 from the front of one or more nozzles or any other preliminary operations necessary for a single shot air blast mode of operation.

A switch 560 starts nozzle sweeping. An indicator lamp 562 illuminates when nozzles are sweeping.

A Fire button 564 initiates a one shot air release. Prior to the actual release, an audible/visible alert may be actuated for several seconds to alert persons near the court to be cleared or dried that a loud sound is imminent. After a several second delay, dump valve 414 is opened.

While conventional toggle switches have been chosen for purposes of disclosure, many alternatives are possible for control panel 504. For example, a touch screen display, not shown, may be used to implement the illustrated functions.

It will be recognized that alterations may be made to control panel 504 to adapt it for controlling a blower-base, continuous air release system. Such changes are considered obvious to persons of skill in the art and are not discussed in further detail herein.

It will be further recognized that semi-automatic or fully automatic control systems may be implemented to allow provide a "single button" to cycle the ball collection and court drying system by providing sequences operation of each component of the system at an appropriate time.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A ball gathering and court drying system for use with a tennis court or the like, comprising:
   a) an air source comprising a compressor operatively connected to a cylindrical plenum disposed at at least one location chosen from the group: beneath a net installed across a width of a tennis court and adjacent at least one edge of a tennis court for supplying pressurized air to at least one nozzle, said at least one nozzle having a tapered portion adjacent a discharge end thereof;
   b) at least one nozzle disposed along and operatively connected to said cylindrical plenum and operatively disposed so as to receive compressed air therefrom, each of said at least one nozzle having a discharge orifice proximate a distal end aimed toward said tennis court for discharging compressed air theretoward; and
   c) a ball receiving sub-system disposed along at least one edge of said tennis court opposite said cylindrical plenum;
   wherein said cylindrical plenum and said at least one nozzle disposed therealong and movable in a vertical plane between a stored position below an upper surface of said tennis court and a raised operational position wherein at least a portion of said at least one nozzle is above said upper surface of said tennis court.

2. The ball gathering and court drying system for use with a tennis court or the like as recited in claim 1, wherein at least one of said at least one nozzle comprises a valve operatively connected between said orifice and said cylindrical plenum.

3. The ball gathering and court drying system for use with a tennis court or the like as recited in claim 2, wherein said valve comprises a valve chosen from the group: a mechanically actuated shutter valve, an electrically actuated solenoid valve, a pneumatically actuated valve, and a hydraulically actuated valve.

4. The ball gathering and court drying system for use with a tennis court or the like as recited in claim 3, the system further comprising:
   d) a controller operatively connected to said air source and said valves, said controller configured to selectively supply air to individual ones of said at least one nozzle.

5. The ball gathering and court drying system for use with a tennis court or the like as recited in claim 1, wherein at least one of said at least one nozzle comprises a rotation apparatus operatively connected thereto allowing said orifice to be moved in a plane parallel to an upper surface of said tennis court.

6. The ball gathering and court drying system for use with a tennis court or the like as recited in claim 1, wherein said cylindrical plenum comprises a planar upper member attached to an upper surface thereof and adapted for mating with an opening in said upper surface of said tennis court such that when said cylindrical plenum and said at least one nozzle disposed therealong are in said stored position, an upper surface of said upper member is contiguous with said upper surface of said tennis court completely closing said opening.

7. The ball gathering and court drying system for use with a tennis court or the like as recited in claim 1, further comprising: a ball gathering sub-system comprising:
   d) a trough disposed in an upper surface of said tennis court and substantially parallel to said at least one edge of said tennis court and sized and configured to receive tennis balls, said trough having at least one of the configurations selected from the group: a slope causing tennis balls to roll along said trough to a terminus disposed at a lowest elevation of said trough, and a mechanical conveyor for conveying tennis balls to said terminus;
   e) a vertical conveyor disposed adjacent said terminus and adapted to receive tennis balls from the trough at said terminus and to elevate said tennis balls to a discharge chute; and
   f) a discharge chute operatively connected to said vertical conveyor to receive tennis balls therefrom and to discharge said tennis balls into a container disposed adjacent said vertical conveyor.

8. The ball gathering and court drying system for use with a tennis court or the like as recited in claim 7, said air source further comprises at least one chosen from the group: an air reservoir tank, a pressure regulator, a pressure gauge, and a pressure relief valve.

9. The ball gathering and court drying system for use with a tennis court or the like as recited in claim 7, wherein said ball gathering sub-system further comprising:
   g) a ball barrier disposed along a side of said trough, said ball barrier being selectively movable between a raised, operational position and a lowered, inoperative position.

10. The ball gathering and court drying system for use with a tennis court or the like as recited in claim 9, wherein said ball barrier is pivotally attached to an upper outer edge of said trench and disposed to selectively pivot between a horizontal, inoperative position to a substantially vertical, operative position.

11. The ball gathering and court drying system for use with a tennis court or the like as recited in claim 9, wherein said ball barrier is disposed vertically within said trench adjacent an outer wall thereof, said ball barrier being selectively elevatable from an inoperative position within said trench to an elevated, operative position.

12. A ball gathering and court drying system for use with a tennis court or the like, comprising:
   a) an air source comprising a compressor operatively connected to a cylindrical plenum disposed beneath a net installed across a width of a tennis court, said cylindrical plenum comprising a at least one nozzle disposed therealong and operatively connected thereto to receive air therefrom, said at least one nozzle having a tapered portion adjacent a discharge end thereof; a first group of said at least one nozzle having a discharge orifice aimed toward a first end of said tennis court, and a second group of said at least one nozzle having a discharge orifice aimed toward an opposing end of said tennis court, at least one of said at least one nozzle comprising a valve operatively connected between said orifice and said cylindrical plenum, said cylindrical plenum and said at least one nozzle being movable in a vertical plane between a stored position below an upper surface of said tennis court and a raised operational position wherein at least a portion of said at least one nozzle is above said upper surface of said tennis court;
   b) a ball receiving sub-system disposed at each end of said tennis court and each comprising a trough disposed substantially parallel to said net and sized and configured to receive tennis balls, said trough having a slope causing tennis balls to roll along said trough to a terminus disposed at a lowest elevation of said trough;
   c) a vertical conveyor disposed adjacent said terminus and adapted to receive tennis balls from the trough at said terminus and to elevate said tennis balls to a discharge chute;
   d) a discharge chute operatively connected to said vertical conveyor to receive tennis balls therefrom and to discharge said tennis balls into a container disposed adjacent said vertical conveyor; and
   e) a controller operatively connected to said air supply and said valves, said controller configured to selectively supply air to individual ones of said at least one nozzle.

13. The ball gathering and court drying system for use with a tennis court or the like as recited in claim 12, wherein said air source further comprises at least one chosen from the group: an air reservoir tank, a pressure regulator, a pressure gauge, and a pressure relief valve.

14. The ball gathering and court drying system for use with a tennis court or the like as recited in claim 12, wherein at least one of said at least one nozzle comprises a rotation apparatus operatively connected thereto allowing said orifice to be moved in a plane parallel to an upper surface of said tennis court.

15. The ball gathering and court drying system for use with a tennis court or the like as recited in claim 12, wherein said cylindrical plenum comprises a planar upper member adapted for mating with an opening in said upper surface of said tennis court such that when said cylindrical plenum and said at least one nozzle disposed therealong are in said stored position, an upper surface of said upper member is contiguous with said upper surface of said tennis court completely closing said opening.

16. A ball gathering and court drying system for use with a tennis court or the like, comprising:
   a) an air source comprising a compressor having an output selectively connected to both a first cylindrical plenum disposed adjacent to and substantially parallel a first edge of a tennis court, and a second cylindrical plenum disposed adjacent and substantially parallel to an opposing second edge of said tennis court for supplying pressurized air to at least one nozzle, said at least one nozzle having a tapered portion adjacent a discharge orifice thereof;
   b) at least one nozzle of said at least one nozzle being disposed along each of said first and said second cylindrical plenums and operatively connected thereto so as to receive air therefrom, each of said at least one nozzle having a discharge orifice proximate a distal end selectively aimable toward said tennis court;
   c) a valve operatively connected between said orifice and a respective one of said first and said second cylindrical plenum, said valve comprising a valve chosen from the group: a mechanically actuated shutter valve, an electrically actuated solenoid valve, a pneumatically actuated valve, and a hydraulically actuated valve;
   d) a controller operatively connected to said air source and said valves, said controller being adapted to perform at least one function selected from the group: selectively control air flow from said air source to said first cylindrical plenum and said second cylindrical plenum, and selectively supply air to individual ones of said at least one nozzle;
   e) a first ball receiving sub-system disposed along a first end of said tennis court and a second ball receiving sub-system disposed along a second, opposing end of said tennis court, each of said first and said second ball receiving sub-system comprising:
      i) a trough disposed in an upper major surface of said tennis court and substantially parallel to a respective one of said first and said second end of said tennis court, said trough being sized and configured to receive tennis balls, said trough having at least one selected from the group: a slope causing tennis balls to roll along said trough to a terminus disposed at a lowest elevation of said trough, and a mechanical conveyor;
      ii) a vertical conveyor disposed adjacent said terminus and adapted to receive tennis balls from the trough at said terminus and to elevate said tennis balls to a discharge chute; and
      iii) a discharge chute operatively connected to said vertical conveyor to receive tennis balls therefrom and to discharge said tennis balls into a container disposed adjacent said vertical conveyor;
   wherein at least one of said first cylindrical plenum and said second cylindrical plenum and said at least one nozzle disposed along each thereof are movable in a vertical plane between a stored position below an upper surface of said tennis court and a raised operational position wherein at least a portion of said at least one nozzle is above said upper surface of said tennis court.

17. A ball gathering and court drying system for use with a tennis court or the like as recited in claim 16, wherein said air source selectively connected to both a first cylindrical plenum and a second cylindrical plenum comprises an air source that is connected alternately to said first cylindrical plenum and said second cylindrical plenum.

18. A ball gathering and court drying system for use with a tennis court or the like as recited in claim 16 wherein each of said at least one nozzle is selectively rotatable between a first position approximately in the range of between 3°-5° relative to a major axis of a net across said tennis court, and a second position approximately in the range between 80°-85° relative to said major axis of said net.

* * * * *